(12) United States Patent
Misra et al.

(10) Patent No.: US 12,393,459 B2
(45) Date of Patent: Aug. 19, 2025

(54) SYSTEM AND METHOD FOR ESG REPORTNG BASED OPTIMIZED RESOURCE ALLOCATION ACROSS ESG DIMENSIONS

(71) Applicant: Accenture Global Solutions Limited, Dublin (IE)

(72) Inventors: Janardan Misra, Bangalore (IN); Shubhashis Sengupta, Karntaka (IN); Sayantan A. Mitra, Karnataka (IN); Sakshi C. Jain, Rajasthan (IN)

(73) Assignee: Accenture Global Solutions Limited, Dublin (IE)

( * ) Notice: Subject to any disclaimer, the term of this patent is extended or adjusted under 35 U.S.C. 154(b) by 472 days.

(21) Appl. No.: 18/079,182

(22) Filed: Dec. 12, 2022

(65) Prior Publication Data

US 2024/0192993 A1 Jun. 13, 2024

(51) Int. Cl.
*G06F 9/50* (2006.01)
(52) U.S. Cl.
CPC .................................. *G06F 9/5027* (2013.01)
(58) Field of Classification Search
CPC ....... G06F 9/5027; G06N 3/044; G06N 20/00
See application file for complete search history.

(56) References Cited

U.S. PATENT DOCUMENTS 11,861,317 B1 * 1/2024 Ramanarayanan ..... G06F 40/30
2016/0371614 A1 * 12/2016 Weatherley-White ....................... G06Q 40/06
2022/0027810 A1 * 1/2022 Murthy .............. G06Q 10/0635
2022/0092382 A1 * 3/2022 Moshovos ............... G06N 3/04
2022/0343433 A1 * 10/2022 Yan ........................ G06Q 40/06
2023/0368557 A1 * 11/2023 Kolavennu ............ G06F 18/23

OTHER PUBLICATIONS

Boussaid et al., "A survey on optimization metaheuristics," Information Sciences, Jul. 2013, 237:82-117.
Gekko.ReadTheDocs.io [online], "GEKKO Optimization Suite," available on or before Feb. 27, 2018 via Internet Archive: Wayback Machine URL<https://web.archive.org/web/20180227134910/https://gekko.readthedocs.io/en/latest/>, retrieved on Jul. 28, 2023, retrieved from URL<https://gekko.readthedocs.io/en/latest/>, 3 pages.

* cited by examiner

*Primary Examiner* — Dong U Kim
(74) *Attorney, Agent, or Firm* — Polsinelli PC

(57) ABSTRACT

Methods, systems and apparatus, including computer programs encoded on computer storage medium, for allocating computation resources using ESG reporting. In one aspect a method includes obtaining data from a knowledge source for an entity, the knowledge source comprising a plurality of ESG disclosures that relate to one or more ESG dimensions; computing vulnerability indicator scores that represent measures of latent vulnerability with respect to the ESG dimensions; computing descriptive distribution scores that represent distributions of descriptions of the ESG dimensions within the knowledge source; determining, using the vulnerability indicator scores and the descriptive distribution scores, an allocation of computational resources to ESG computational processes associated with the ESG dimensions that achieves an increased gain in sustainability for the entity; and initiating allocation of the computational resources to the ESG computational processes according to the determined allocation.

19 Claims, 7 Drawing Sheets

SYSTEM AND METHOD FOR ESG REPORTNG BASED OPTIMIZED RESOURCE ALLOCATION ACROSS ESG DIMENSIONS

TECHNICAL FIELD

This specification generally relates to methods, systems, and devices for allocating computational resources to improve sustainability.

BACKGROUND

Sustainability can include three components: environmental, social, and governance (ESG). Environmental sustainability aims to improve human welfare through the protection of natural capital, e.g. land, air, water, minerals etc. Environmental sustainability places emphasis on how organizations can achieve positive economic outcomes without doing any harm, in the short- or long-term, to the environment. To improve environmental sustainability, an organization can accurately and consistently measure the environmental impact of its activities. Measured environmental impacts can be used to adjust the organization's activities or drive more sustainable decisions. For example, an organization can regularly scan its inventory to collect data and use the data to compute the inventory carbon impact. The carbon impact can provide insights that can be used to drive more sustainable decisions relating to production and transport.

SUMMARY

This specification describes systems and methods for optimizing computational resource allocation over ESG dimensions using ESG disclosures to improve sustainability.

In general, one innovative aspect of the subject matter described in this specification may be embodied in methods that include obtaining data from a knowledge source for an entity, the knowledge source comprising a plurality of environmental, social, and governance (ESG) disclosures, wherein the ESG disclosures relate to one or more ESG dimensions; computing, using the obtained data, a vulnerability indicator score for each of the ESG dimensions, wherein a vulnerability indicator score for an ESG dimension represents a measure of latent vulnerability with respect to the ESG dimension; computing, using the obtained data, a descriptive distribution score for each of the ESG dimensions, wherein the descriptive distribution scores represent a distribution of descriptions of the ESG dimensions within the knowledge source; determining, using the vulnerability indicator scores and the descriptive distribution scores, an allocation of computational resources to ESG computational processes associated with the ESG dimensions that achieves an increased gain in sustainability for the entity; and initiating allocation of the computational resources to the ESG computational processes associated with the ESG dimensions according to the determined allocation.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other implementations can each optionally include one or more of the following features, alone or in combination. In some implementations computing a VIS for an ESG dimension comprises: computing dimension indicator scores for the ESG dimension, wherein each dimension indicator score for the ESG dimension corresponds to a respective knowledge element in one of the ESG disclosures and represents an extent to which the knowledge element indicates a vulnerability on the ESG dimension; and aggregating dimension indicator scores for the ESG dimension to compute a VIS for the ESG dimension.

In some implementations computing a dimension indicator score for the ESG dimension comprises: processing a respective knowledge element using a first machine learning classifier to classify the knowledge element as belonging to one of multiple categories, the categories comprising ESG categories and one non-ESG category; determining whether the knowledge element is classified as belonging to an ESG category; in response to determining that the knowledge element is classified as belonging to an ESG category, processing the knowledge element using a second machine learning classifier to obtain an output that detects a type of vulnerability associated with the knowledge element; and computing the dimension indicator score for the ESG dimension as equal to a maximum value of the output.

In some implementations processing the knowledge element using a second machine learning classifier further comprises obtaining data that predicts whether the vulnerability is solved, ongoing, or potential.

In some implementations the first machine learning classifier comprises: a trained ROBERTa model comprising multiple hidden layers, wherein the ROBERTa model is configured to receive a knowledge element as input; two or more dense layers configured to receive outputs from the ROBERTa model; and a classification layer with softmax activation configured to receive outputs from the two or more dense layers.

In some implementations the second machine learning classifier comprises: a trained ROBERTa model comprising multiple hidden layers, wherein the ROBERTa model is configured to receive a knowledge element as input; four dense layers, each configured to receive an output from a respective last layer of the ROBERTa model, wherein the four dense layers identify structure and hidden causes of a vulnerability from the knowledge element; a fifth dense layer configured to receive outputs from each of the four dense layers; a classification layer configured to receive an output from the fifth dense layer; a BiLSTM layer configured to receive an output from a last layer of the ROBERTa model; and a temporal prediction layer configured to receive an output from the BiLSTM layer and output a temporal prediction for the vulnerability.

In some implementations a descriptive distribution score for an ESG dimension is dependent on normalized pointwise mutual information values of the ESG dimension and knowledge elements in the ESG disclosures and sentiment scores of the ESG dimension for the knowledge elements in the ESG disclosures.

In some implementations computing a descriptive distribution score for an ESG dimension comprises: computing normalized pointwise mutual information values of the ESG dimension and knowledge elements in the ESG disclosures; computing sentiment scores of the ESG dimension for the knowledge elements in the ESG disclosures; computing, using the normalized pointwise mutual information values and the sentiment scores, an information value for each of the knowledge elements in the ESG disclosures, wherein an information value for a knowledge element comprises a weighted sum of the normalized pointwise mutual information value of the ESG dimension and the knowledge element and the sentiment score of the ESG dimension for the knowledge element.

In some implementations a descriptive distribution score for an ESG dimension is dependent on relative discourse significance values that represent relative significances of the ESG dimensions to the entity.

In some implementations computing a descriptive distribution score for an ESG dimension comprises: determining an amount of information related to the ESG dimension included in knowledge elements in the ESG disclosures that are related to the ESG dimension; determining an amount of information related to all of the one or more ESG dimensions included in knowledge elements in the ESG disclosures; and computing a relative discourse significance value for the ESG dimension by dividing the amount of information related to the ESG dimension included in knowledge elements in the ESG disclosures that are related to the ESG dimension by the amount of information related to all of the one or more ESG dimensions included in knowledge elements in the ESG disclosures.

In some implementations the method further comprises receiving a data input comprising a set of materiality values, wherein the materiality values represent a current importance of one or more of the ESG dimensions to the entity; in response to receiving the data input, computing a correlation value for each of the one or more ESG dimensions; and adjusting, using the correlation values, the relative discourse significance values of the one or more ESG dimensions.

In some implementations computing a descriptive distribution score for an ESG dimension comprises: computing a first value comprising a relative significance value of the ESG dimension multiplied by a volume of relevant quantifiable information contained in the knowledge source specific to the ESG dimension; computing a second value comprising a sum, over all ESG dimensions, of a relative significance of an ESG dimension multiplied by a volume of relevant quantifiable information contained in the knowledge source specific to the ESG dimension; and computing the descriptive distribution score for the ESG dimension by dividing the first value by the second value.

In some implementations determining an allocation of computational resources to ESG computational processes associated with the ESG dimensions that achieves an increased gain in sustainability for the entity comprises: performing a constrained optimization to determine values of optimization parameters that optimize an objective function, wherein each optimization parameter corresponds to a respective ESG dimension and represents a number of units of sustainability gains for the respective ESG dimension, and the objective function comprises a weighted linear sum, over all ESG dimensions, of a vulnerability indicator score for a ESG dimension added to a descriptive distribution score for the ESG dimension, wherein each term in the linear sum is weighted by a respective optimization parameter for the ESG dimension.

In some implementations the constrained optimization comprises a constraint that penalizes solutions to the constrained optimization that produce an allocation of computational resources that use a number of computational resources that is larger than or smaller than an available number of computational resources.

In some implementations the method further comprises determining the allocation of computational resources to ESG computational processes associated with the ESG dimensions using the values of the optimization parameters that optimize the objective function, comprising, for each ESG dimension: multiplying a value of an optimization parameter for the ESG dimension by a corresponding computational resource cost of the unit sustainability gain on the ESG dimension.

In some implementations the computational resources comprise computational servers in a cloud, network bandwidth for data communication, storage or capacity and wherein the ESG computational processes comprise data generation, storage, processing, communication, information extraction by analyzing temporal patterns, outlier detection and analysis of outliers, or processes for measuring emissions or energy usage.

In some implementations the ESG disclosures comprise one or more of sustainability reports, social media feeds, articles, and news reports and wherein the one or more ESG dimensions comprise low-level dimensions directly determined from the knowledge source and high-level dimensions obtained by aggregating over the low-level dimensions.

In some implementations the obtained data comprises data representing ESG disclosures relating to vulnerabilities across the one or more ESG dimensions, and wherein the method further comprises processing ESG disclosures using keyword detection to identify the ESG disclosures relating to vulnerabilities across the one or more ESG dimensions.

Some implementations of the subject matter described herein may realize, in certain instances, one or more of the following technical advantages.

To improve sustainability, an organization can dynamically monitor various processes and activities to collect data that can be analyzed to determine the organization's performance across different sustainability dimensions. Such performance values can be used to initiate actions that improve the organization's performance across the sustainability dimensions, e.g., reduce its carbon footprint. However, organizations can implement hundreds of processes and activities at any one time. Knowing which processes or activities to monitor and how intensely the processes or activities should be monitored in order to obtain the most actionable information that can be used to improve the organization's performance across sustainability dimensions is a complex and challenging task.

The present invention addresses this problem. A system implementing the present invention computes values of latent parameters indicated by documented information associated with ESG dimensions. The system uses the estimated values (and specifically defined optimization parameters) to formulate an optimization problem (e.g., define an objective function) and determine an allocation of constrained computational resources across competing ESG computational processes. When implemented, the allocation of constrained computational resources can achieve increased gains in sustainability, e.g., reductions in greenhouse gas emissions, reductions in energy usage, reductions in waste, reduction of carbon footprint.

Further, incorporating information extracted from ESG disclosures improves the accuracy of the allocation of constrained computational resources and its ability to achieve sustainability gains since the determined allocation is generated using more targeted, relevant data and better characterizes the organization's current performance across different sustainability dimensions.

In addition, incorporating information extracted from ESG disclosures can also be used to design new ESG data disclosure management processes or extend current processes. Such processes can use the information extracted from ESG disclosures as additional parameter to make decisions regarding managing ESG disclosure data.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

This specification describes techniques for determining optimal allocations of constrained computational resources across multiple ESG computational processes. The techniques estimate values of latent parameters indicated by documented information associated with ESG dimensions and use the estimated values to determine an allocation of constrained computational resources across competing ESG computational processes that achieves increased, e.g., maximal, gains in sustainability.

Figure 1:
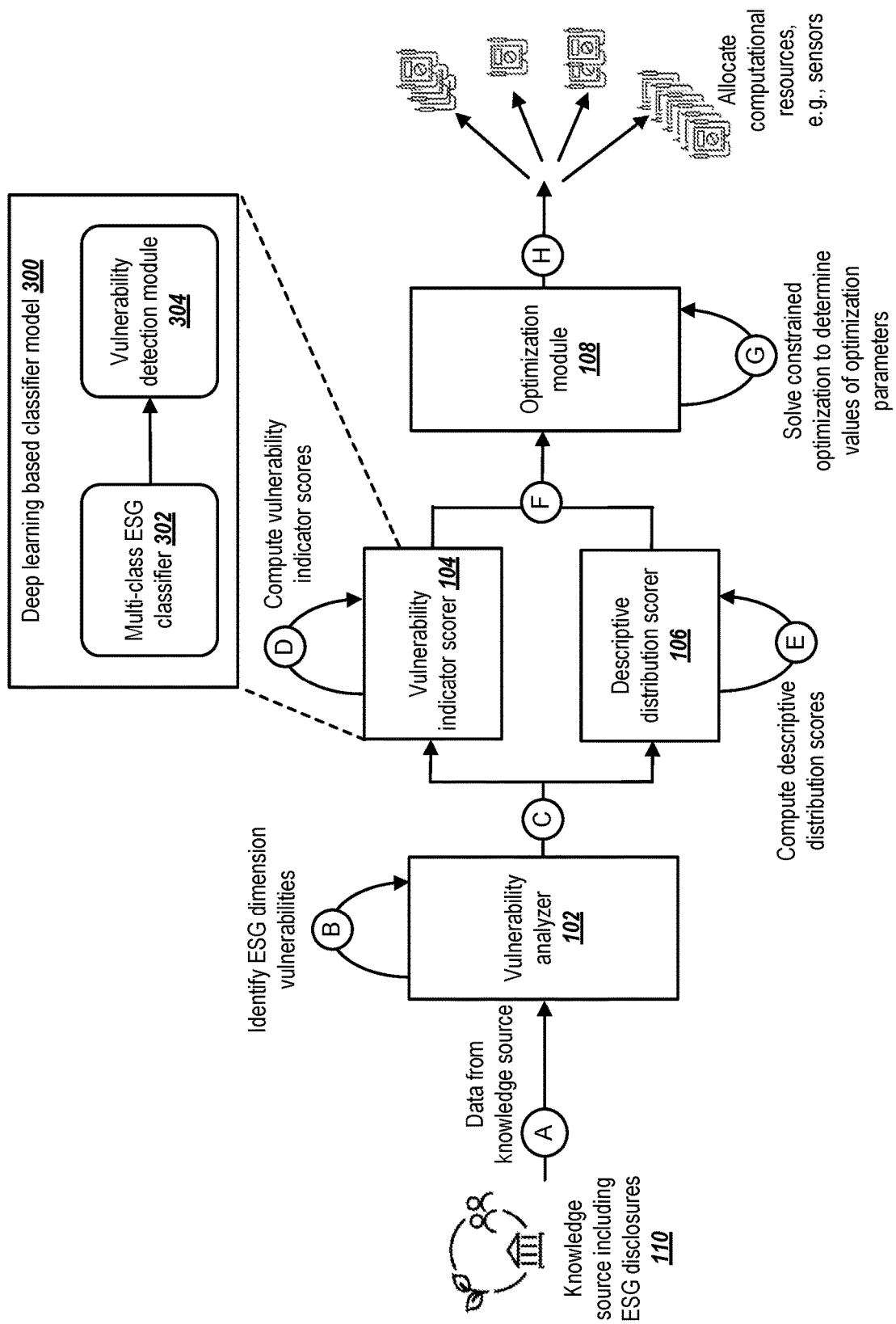
FIG. 1 is a block diagram of an example process for allocating computational resources using ESG disclosures.

FIG. 1 is a block diagram 100 of an example process for allocating computational resources using ESG disclosures. The block diagram illustrates the example process as including multiple stages (A)-(H). However, in some implementations the example process can include fewer or more stages. Each of the multiple stages are illustrated as being performed by respective components of an example computational resource allocation system. However, in some implementations, different stages of the example process can be performed by other computing modules.

During stage (A) of the example process, a vulnerability analyzer 102 obtains data from a knowledge source 110 associated with a particular entity or cluster of entities. The knowledge source 110 includes ESG disclosures for the entity, e.g., documents that contain descriptions of the entity's performance across one or more predefined ESG dimensions. For example, the documents can include sustainability reports, environmental reports, newspaper or magazine articles, news reports, or social media feeds. The ESG disclosures can include current ESG disclosures as well as historical ESG disclosures, e.g., disclosures from a predetermined historical time period.

The ESG dimensions can include low-level dimensions that can be directly determined from the knowledge source, e.g., an amount of compressed natural gas generated during a manufacturing process performed by the entity, an amount of liquefied petroleum gas consumed during operations performed by the entity, or a gender ratio of people currently employed by the entity. The ESG dimensions can also include high-level dimensions obtained by aggregating over the low-level dimensions, e.g., average greenhouse gas emissions, energy usage or water usage, renewable energy usage, carbon footprint, product liabilities, corporate performance, etc.

During stage (B), the vulnerability analyzer 102 filters the obtained data to identify ESG disclosures that are related to (or include descriptions of) ESG dimension vulnerabilities for the entity. An ESG dimension vulnerability is an indication or likelihood of an occurrence of an adverse event, e.g., an event that could cause a sustainability ranking on the ESG dimension to drop in the future. To identify ESG disclosures that are related to ESG dimension vulnerabilities for the entity, the vulnerability analyzer 102 can perform text analysis of the ESG disclosures to identify disclosures (or portions of disclosures) that describe ESG dimensions in a negative context or include values of performance metrics that are below predetermined critical thresholds.

During stage (C), the vulnerability analyzer 102 provides data representing ESG disclosures that are related to ESG dimension vulnerabilities for the entity to a vulnerability indicator scorer 104 and a descriptive distribution scorer 106. The number of ESG disclosures provided to the vulnerability indicator scorer 104 and descriptive distribution scorer 106 can vary, e.g., the number can be any number larger than or equal to one. Generally, increasing the number of ESG disclosures can improve the reliability of scores computed using the ESG disclosures (more particularly, the reliability of the scores increases with the amount of unique information contained in the ESG disclosures).

During stage (D), the vulnerability indicator scorer 104 processes the data received during stage (C) to compute vulnerability indicator scores (VIS) for respective ESG dimensions (e.g., ESG dimensions for which information is available in the knowledge source). A VIS for an ESG dimension is a score that represents a measure of latent vulnerability with respect to the ESG dimension, e.g., where a high VIS for an ESG dimension represents a high likelihood of an occurrence of an event that could cause a sustainability ranking on the ESG dimension to drop in the future and a low VIS represents a low likelihood of an occurrence of an event that could cause a sustainability ranking on the ESG dimension to drop in the future.

To compute a VIS for a specific ESG dimension d, the vulnerability indicator scorer 104 first computes dimension indicator scores (DisScores) for knowledge elements included in the ESG disclosures received from the vulnerability indicator scorer 104 at stage (C). A DisScore for a knowledge element a is a score that represents an extent to which the knowledge element a indicates a vulnerability for the entity on the ESG dimension d. Knowledge elements are portions of text included in the ESG disclosures, e.g., sentences, paragraphs, sections, or pages of an ESG disclosure.

To compute the DisScores, the vulnerability indicator scorer 104 uses a machine learning based system that is trained to perform text analysis of knowledge elements to generate confidence scores that represent respective DisScores. In some implementations the machine learning based system can be a deep learning based classifier model 300 with a dual classifier architecture, e.g., including a multi-class ESG classifier 302 and a vulnerability detection module 304, as described below with reference to FIG. 3. In these implementations, the machine learning based system can be trained using a set of labelled knowledge sources, e.g., where the labels used to label knowledge elements in the knowledge sources are ESG categories ir vulnerability classes. An example deep learning based classifier model 300 is described below with reference to FIG. 3. Other example machine learning based systems are described below with reference to FIG. 2.

The vulnerability indicator scorer 104 aggregates the DisScores for a specific ESG dimension to compute a VIS for the ESG dimension. Example operations performed by the vulnerability indicator scorer 104 are described in more detail below with reference to FIG. 5.

During stage (E), descriptive distribution scorer 106 processes the data received during stage (C) to compute descriptive distribution scores (DDS) for respective ESG dimensions (e.g., ESG dimensions for which information is available in the knowledge source). A DDS for an ESG dimension is a score that represents a relevance or significance of the ESG dimension for the entity, e.g., where a high DDS for an ESG dimension represents a high relevance or significance and a low DDS for an ESG dimension represents a low relevance or significance. A collection of DDS scores for all ESG dimensions described in the ESG disclosures shows the distribution of descriptions of the ESG dimensions within the knowledge source, e.g., whether the knowledge source is heavily focused on one or more particular ESG dimensions or generally concerned with a broad range of ESG dimensions. Example operations performed by the descriptive distribution scorer 106 to compute DDS scores for ESG dimensions are described in more detail below with reference to FIG. 6.

During stage (F), the vulnerability indicator scorer 104 and descriptive distribution scorer 106 provide data representing the vulnerability indicator scores for the ESG dimensions and the descriptive distribution scores for the ESG dimensions to the optimization module 108.

During stage (G), the optimization module 108 determines an optimized computational resource allocation to ESG computational processes associated with the ESG dimensions using the vulnerability indicator scores and the descriptive distribution scores. In particular, the optimization module 108 can perform a constrained optimization to determine values of optimization parameters that optimize (e.g., minimize) an objective function in the presence of constraints on the optimization parameters. Each optimization parameter corresponds to a respective ESG dimension and represents a number of units of sustainability gains for the respective ESG dimension. The objective function is dependent on the optimization parameters, the vulnerability indicator scores, and the descriptive distribution scores. The constraints on the optimization parameters include a constraint that penalizes optimization solutions, e.g., configurations of values of the optimization parameters, that produce an allocation of computational resources that use a number of computational resources that is larger than or smaller than an available number of computational resources. An example set of optimization parameters, objective function, and constraint are described in more detail below with reference to FIG. 4.

During stage (H), the computational resource allocation system allocates computational resources to ESG computational processes associated with the ESG dimensions according to the optimized computational resource allocation determined during stage (G).

Figure 2:
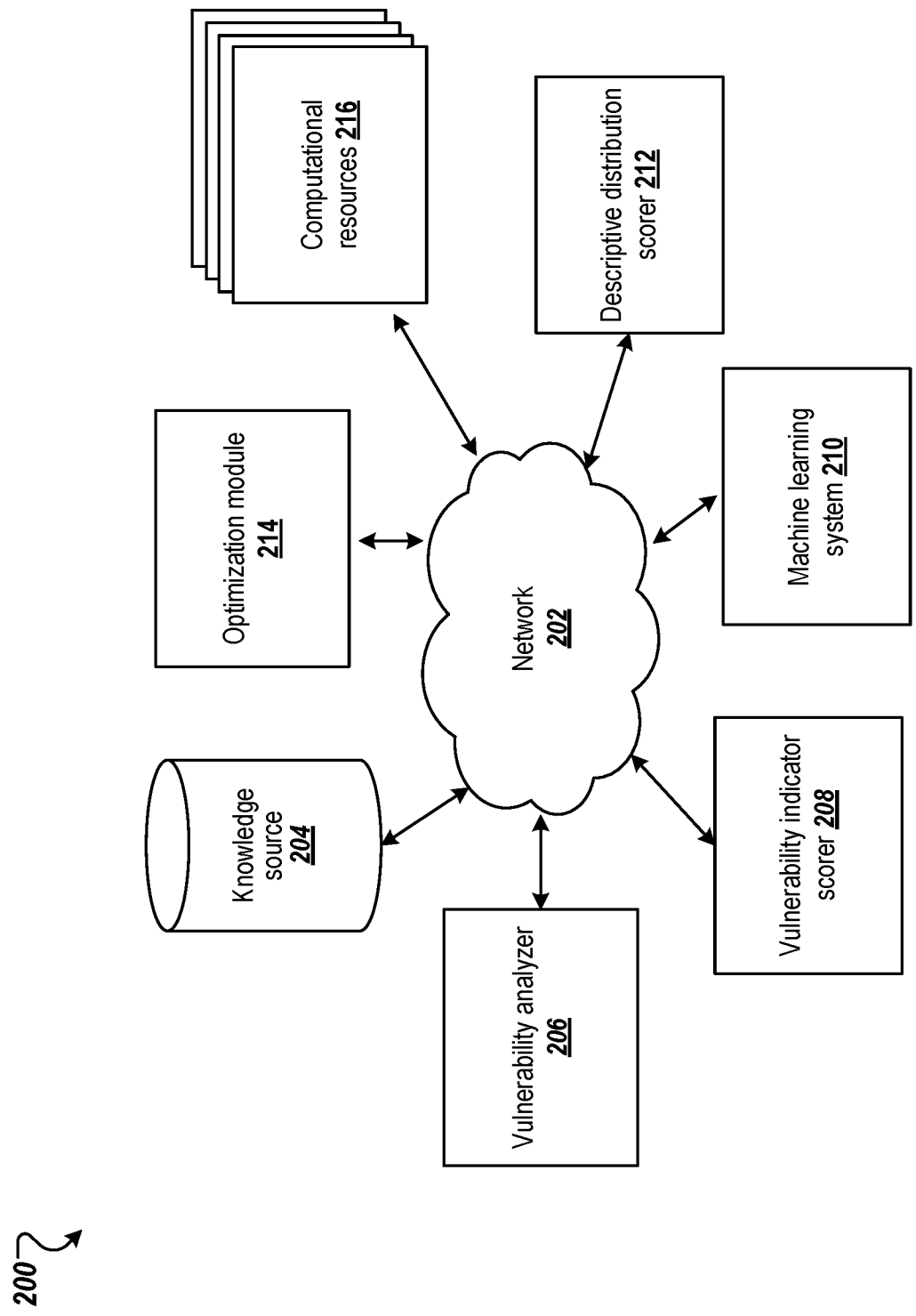
FIG. 2 is a block diagram of an example computational resource allocation system.

FIG. 2 is a block diagram of an example computational resource allocation system 200. The example computational resource allocation system 200 can be configured to implement the computational resource allocation processes described herein. The example computational resource allocation system 200 includes a network 202 (e.g., a local area network (LAN), wide area network (WLAN), the Internet, or a combination thereof). The network 302 can be accessed over a wired and/or a wireless communications link. The network 302 connects a knowledge source 204, a vulnerability analyzer 206, a vulnerability indicator scorer 208, a machine learning system 210, a descriptive distribution scorer 212, an optimization module 214, and multiple computational resources 216.

As described above with reference to FIG. 1, the knowledge source 204 includes ESG disclosures for an entity or a cluster of entities. An ESG disclosure is a document that discloses data relating to the entity's operations across ESG standards. ESG disclosures allow an entity to publicize their ESG policies, practices, performance, and goals. ESG disclosures can include information relating to an entity's environmental impact, e.g., information on the entity's water and energy usage, waste management, and greenhouse gas emissions, information relating to the entity's social interactions, e.g., details of community engagement, labor practices, and diversity efforts, and information relating to the entity's governance, e.g., information relating to the entity's compliance, political contributions, board structure, and diversity. Example ESG disclosures include sustainability reports, environmental reports, newspaper or magazine articles, news reports, or social media feeds. The ESG disclosures can include current ESG disclosures as well as historical ESG disclosures, e.g., disclosures from a predetermined historical time period. In other words, the knowledge source 204 can include a collection of historical knowledge sources from a predetermined historical time period.

The vulnerability analyzer 206 is configured to analyze ESG disclosures included in the knowledge source 204 and identify ESG disclosures that are related to vulnerabilities across ESG dimensions. For example, the vulnerability analyzer 206 can be configured to perform keyword extraction to identify ESG disclosures that describe or relate to ESG dimension vulnerabilities.

The machine learning system 210 is configured to perform text analysis of input text, e.g., knowledge elements from the knowledge source 204, to generate confidence scores that classify the input text as being related to one or more ESG vulnerabilities. In some implementations the machine learning system 210 can include a deep learning based classifier model, as described below with reference to FIG. 3. In other implementations the machine learning based system can be a regression model that is configured to apply statistical regression methods (linear or non-linear) to estimate ESG dimension vulnerabilities. In these implementations, the machine learning based system can be trained using a set of labelled knowledge sources, e.g., where labels used to label knowledge elements in the knowledge sources are numerical values. In other implementations the machine learning based system can be configured to estimate ESG dimension vulnerabilities as normalized densities of vulnerability indicator terms within the knowledge source or using supervised topic models. In these implementations, the machine learning based system can be trained using a set of labelled knowledge sources, e.g., where labels used to label knowledge elements in the knowledge sources are indicator terms or vulnerability topics.

The vulnerability indicator scorer 208 is configured to compute vulnerability indicator scores that measure a latent vulnerability with respect to different ESG dimensions, e.g., as described below with reference to Eq. (3). To compute the vulnerability indicator scores, the vulnerability indicator scorer 208 is configured to communicate with the machine learning system 210 to obtain ESG vulnerability classifications of knowledge elements included in the knowledge source 204. The vulnerability indicator scorer 208 is configured to process the obtained ESG vulnerability classifications and aggregate the processed ESG vulnerability classifications to compute the vulnerability indicator scores. Example operations performed by the vulnerability indicator scorer 208 are described in more detail below with reference example process 500 of FIG. 5.

The descriptive distribution scorer 212 is configured to compute descriptive distribution scores that measure a distribution of descriptive densities of ESG dimensions within the knowledge sources 204, e.g., as described below with reference to Eq. (10). To compute the descriptive distribution scores, the descriptive distribution scorer 212 is configured to analyze ESG disclosures included in the knowledge source 204 to compute information theoretic quantities, e.g., normalized pointwise mutual information values, for knowledge elements and ESG dimensions included in the knowledge source 204. The descriptive distribution scorer 212 is further configured to perform natural language processing, e.g., sentiment analysis, on knowledge elements and ESG dimensions included in the knowledge source 204 to compute sentiment scores for the knowledge elements. The descriptive distribution scorer 212 is configured to process the computed information theoretic quantities and sentiment scores to compute the descriptive distribution scores. Example operations performed by the descriptive distribution scorer 212 are described in more detail below with reference example process 600 of FIG. 6.

The optimization module 214 is configured to implement constrained optimization algorithms to solve constrained optimization problems. For example, the optimization module 214 can include optimization software that is configured to solve large-scale mixed-integer and differential algebraic equations using nonlinear programming solvers.

The multiple computational resources 216 include computational resources available to the entity for analyzing information and activities relating to ESG dimensions. For example, the computational resources 216 can include computational servers in a cloud, network bandwidth for data communication, storage or capacity, or physical devices such as sensors.

Figure 3:
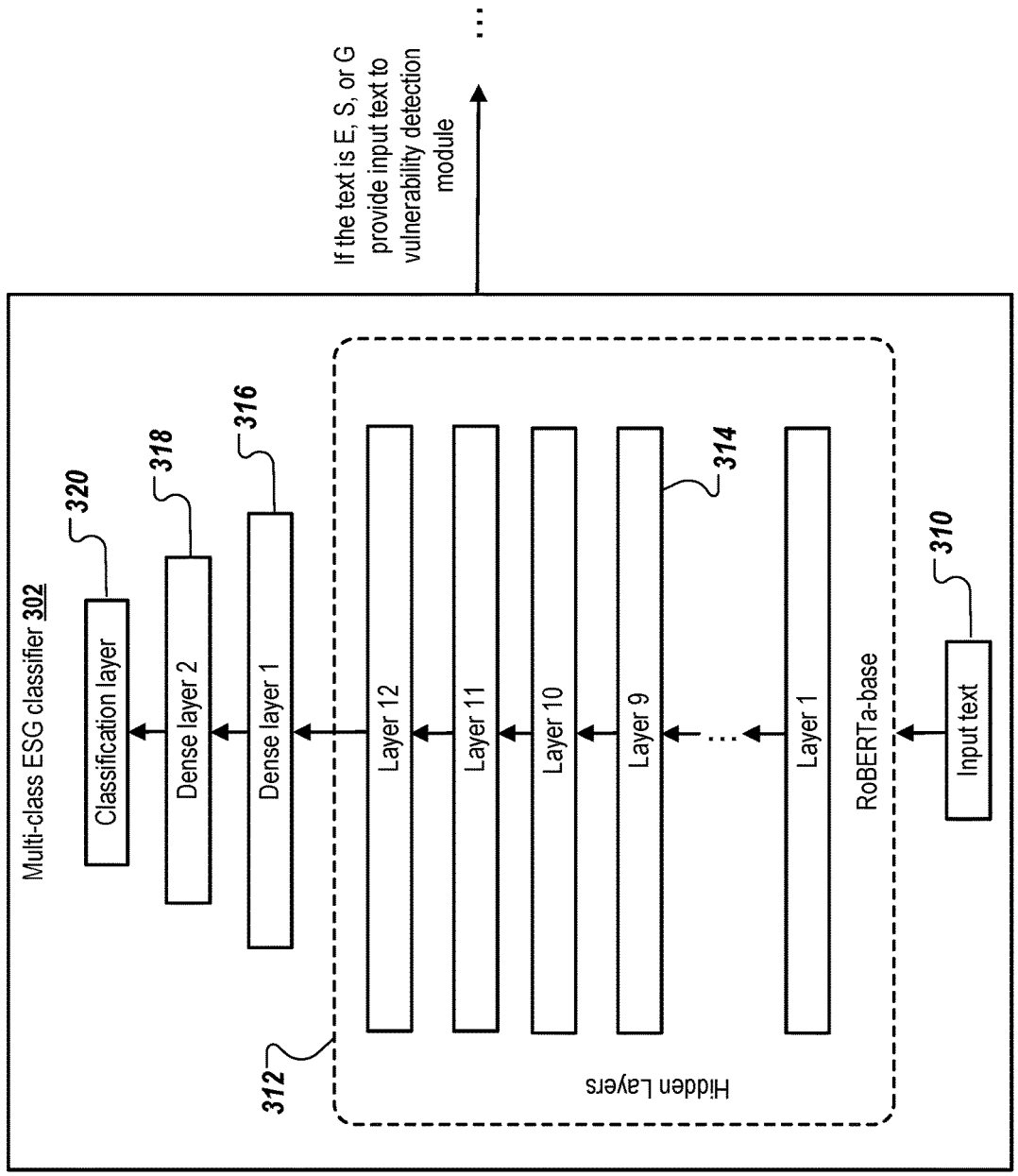
FIG. 3 is a block diagram of an example deep learning classifier model.
Figure 3:
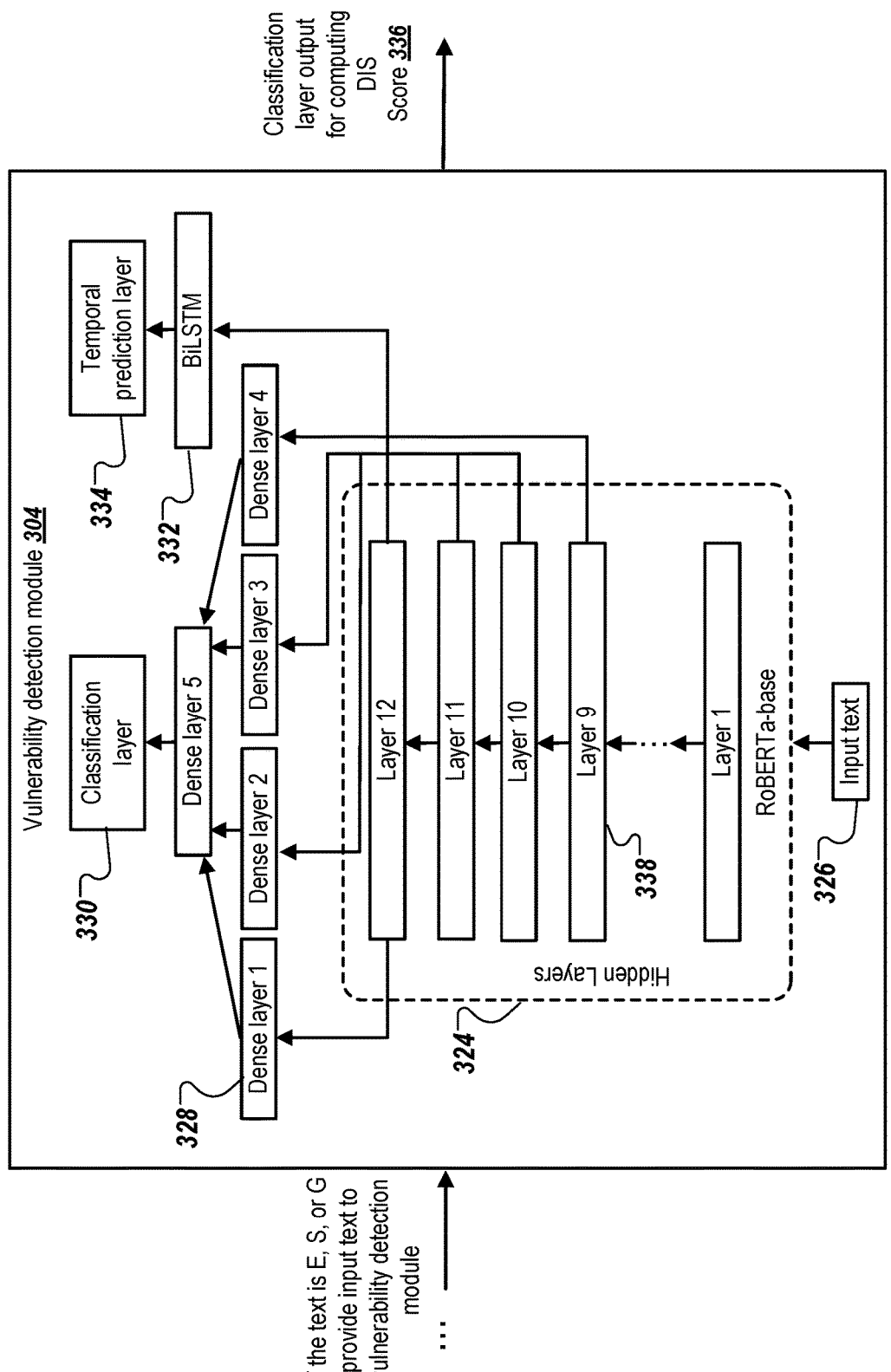

FIG. 3 is a block diagram of an example deep learning classifier model 300. The example deep learning classifier model 300 can be configured to implement the techniques for computing dimension indicator scores described herein. The example deep learning classifier model 300 is has a dual classifier architecture and includes a multi-class ESG classifier 302 and a vulnerability detection module 304.

The multi-class ESG classifier 302 includes a ROBERTa model 312. The RoBERTa model 312 includes multiple hidden layers, e.g., layer 314. In the example shown in FIG. 3 the ROBERTa model 312 includes twelve hidden layers, however in some implementations the ROBERTa model 312 can include more or fewer hidden layers. The RoBERTa model 312 is configured to receive as input a portion of text 310, e.g., a knowledge element included in an ESG disclosure. In some implementations the input text can be tokenized. The ROBERTa model 312 is configured to process the input text 310 to generate a corresponding output.

The multi-class ESG classifier 302 further includes two dense layers 316 and 318. The first dense layer 316 is configured to receive outputs from the ROBERTa model 316. In some implementations the first dense layer 316 can have a size of 2046 nodes. The second dense layer 318 is configured to receive outputs from the first dense layer 316. In some implementations the second dense layer 318 can have less nodes than the first dense layer, e.g., a size of 1024 nodes.

The multi-class ESG classifier 302 further includes a classification layer 320. The classification layer is configured to receive outputs from the second dense layer 318 and to process the received outputs using a softmax activation. The classification layer 320 includes a number of nodes that is equal to the number of classification categories, e.g., four nodes.

The multi-class ESG classifier 302 can be trained on ESG training data to process input text and identify which of multiple categories the input text is related to. The categories include ESG categories, e.g., an environmental category, a social category, and a governance category, and a non-ESG category (or general category).

The vulnerability detection module 304 includes a ROBERTa model 324. The ROBERTa model 324 includes multiple hidden layers, e.g., layer 338. In the example shown in FIG. 3 the ROBERTa model 324 includes twelve hidden layers, however in some implementations the ROBERTa model 324 can include more or fewer hidden layers. Like the ROBERTa model 312, the ROBERTa model 324 is configured to receive as input a portion of text 326. However, the ROBERTa model 324 only receives portions of text that have been classified by the multi-class ESG classifier 302 as relating to an ESG category. In some implementations the input text can be tokenized. The RoBERTa model 324 is configured to process the input text 326 to generate a corresponding output.

The vulnerability detection module 304 further includes four dense layers, e.g., dense layer 328. Each of the four dense layers is configured to receive an output from a respective last layer of the ROBERTa model 324. For example, dense layer 1 is configured to receive an output from hidden layer 12, dense layer 2 is configured to receive an output from hidden layer 11, dense layer 3 is configured to receive an output from hidden layer 10, and dense layer 4 is configured to receive an output from hidden layer 9. The four dense layers identify structure and hidden causes of a vulnerability from the input text. In some implementations each of the four dense layers can have a size of 786 nodes.

The vulnerability detection module 304 further includes a fifth dense layer that is configured to receive outputs from each of the above described four dense layers. In some implementations the fifth dense layer can have a size of 2046 nodes.

The vulnerability detection module 304 further includes a classification layer 330 that determines which ESG vulnerability the input text relates to. The classification layer 330 is configured to receive an output from the fifth dense layer and to process the received outputs using a tanh activation. The classification layer 330 includes a number of nodes that is equal to the number of classification categories. The classification categories include types of vulnerabilities, e.g., emissions vulnerability, energy efficiency vulnerability, labor vulnerability, etc. In some implementations the classification categories can include 20 categories.

The vulnerability detection module 304 further includes a BILSTM layer 332. The BiLSTM layer 332 is configured to receive an output from a last hidden layer of the ROBERTa model, e.g. hidden layer 12. In some implementations the BiLSTM layer 332 can have a size of 100 nodes.

The vulnerability detection module 304 further includes a temporal prediction layer 334 that determines whether an ESG vulnerability related to the input text has been resolved, is ongoing, or may occur in the future. The temporal prediction layer 334 is configured to receive an output from the BiLSTM layer and output a temporal prediction for the vulnerability. The temporal prediction layer 334 can have a size of 3 nodes, where the nodes correspond to the classes solved, ongoing, and potential.

The vulnerability detection module 304 can be trained on ESG training data to process input text and identify which of multiple ESG vulnerability categories the input text is related to and which temporal category the input text is related to. The classification layer 330 and the temporal prediction layer 334 can be jointly optimized during training.

If the temporal prediction layer 334 indicates that an ESG vulnerability related to input text is ongoing or potential, the vulnerability detection module 304 can provide the output of the classification layer 330 for the input text as an output for computing a dimension indicator score 336, as described below with reference to step 502d of example process 500.

Figure 4:
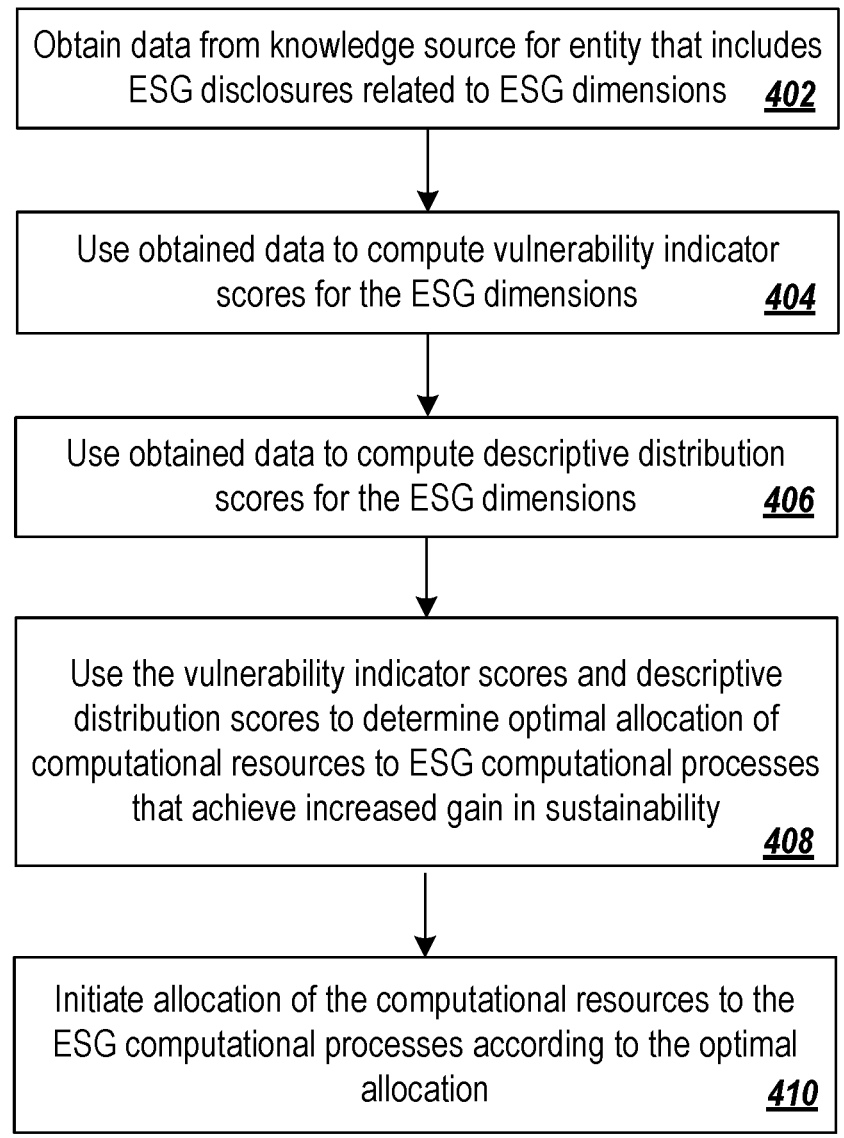
FIG. 4 is a flow chart of an example process for allocating computational resources using ESG disclosures.

FIG. 4 is a flow chart of an example process 400 for allocating computational resources using ESG disclosures. For convenience, the process 400 will be described as being performed by a system of one or more computers located in one or more locations. For example, the computational resource allocation system 200 of FIG. 2, appropriately programmed, can perform example process 400.

The system obtains data from a knowledge source for an entity that includes multiple ESG disclosures, where the ESG disclosures relate to one or more ESG dimensions (step 402). The ESG disclosures include information relating to the entity's environmental impact, social interactions, and governance. For example, the ESG disclosures can include one or more of sustainability reports, social media feeds, articles, and news reports. The ESG dimensions can include low-level dimensions directly determined from the knowledge source and high-level dimensions obtained by aggregating over the low-level dimensions.

In some implementations the data obtained by the system at step 402 can include data representing ESG disclosures that relate to vulnerabilities across the one or more ESG dimensions. For example, in some implementations the system can filter the ESG disclosures included in the knowledge source, e.g., using keyword detection, to identify ESG disclosures that relate to vulnerabilities across the one or more ESG dimensions.

The system uses the obtained data to compute a vulnerability indicator score (VIS) for each of the ESG dimensions (step 404). A VIS for an ESG dimension represents a measure of latent vulnerability with respect to the ESG dimension. An example process for computing a VIS for an ESG dimension is described below with reference to FIG. 5.

The system uses the obtained data to compute a descriptive distribution score (DDS) for each of the ESG dimensions (step 406). The descriptive distribution scores represent a distribution of descriptions of the ESG dimensions within the knowledge source. A descriptive distribution score for an ESG dimension is dependent on normalized pointwise mutual information values of the ESG dimension and knowledge elements in the ESG disclosures, sentiment scores of the ESG dimension for the knowledge elements in the ESG disclosures, and relative discourse significance values that represent relative significances of the ESG dimensions to the entity. An example process for computing a DDS for an ESG dimension is described below with reference to FIG. 6.

The system uses the vulnerability indicator scores and the descriptive distribution scores to determine an allocation of computational resources to ESG computational processes associated with the ESG dimensions that achieves an increased gain, e.g., maximal, in sustainability for the entity (step 408). The computational resources can include computational servers in a cloud, network bandwidth for data communication, storage or capacity. The ESG computational processes can include data generation, storage, processing, communication, information extraction by analyzing temporal patterns, outlier detection and analysis of outliers, or processes for measuring emissions or energy usage.

To determine the allocation of computational resources, the system performs a constrained optimization to determine values of optimization parameters that optimize an objective function.

The optimization parameters include a set of parameters $\alpha d_1, \ldots, \alpha_{d_{|D|}}$ that can each take a value that is larger than or equal to zero. Each parameter $\alpha_{d_i}$ in the set corresponds to a respective ESG dimension $d_i$ in the set of ESG dimensions D and represents a number of units of sustainability gains for the respective ESG dimension. The parameters included in the set are dependent on the organization and the ESG dimensions referred to in the ESG disclosures (i.e., the ESG dimensions that are relevant to the organization). For example, one parameter in the set can correspond to an average greenhouse gas emissions. In this example, a unit of sustainability for the ESG dimension can be equal to a ton of carbon dioxide equivalents and a unit of sustainability gain can be a one ton reduction of carbon dioxide equivalents. As another example, one parameter in the set can correspond to an average source energy use, e.g., electricity use. In this example, a unit of sustainability for the ESG dimension can be equal to an predefined number of British thermal units or kilowatts of electricity and a unit of sustainability gain can be a reduction of electricity by the predefined number.

The objective function is dependent on the vulnerability indicator scores and the descriptive distribution scores, and includes a weighted linear sum (over all ESG dimensions) of a vulnerability indicator score for a ESG dimension added to a descriptive distribution score for the ESG dimension, where each term in the linear sum is weighted by a respective optimization parameter for the ESG dimension. That is, the objective function can be given by $$\sum_{d \in D} \alpha_d \times (VIS(K_T, d, Z, T) + DDS(K_T, Z, d, T)) \tag{1}$$

where $d \in D$ represent ESG dimensions in the set of ESG dimensions D, $\alpha_d$ represents an optimization parameter corresponding to ESG dimension d, $VIS(K_T,d,Z,T)$ represents the vulnerability indicator score for ESG dimension d and $DDS(K_T,Z,d,T)$ represents the descriptive distribution score for ESG dimension d.

The constrained optimization includes a constraint that penalizes solutions to the constrained optimization that produce an allocation of computational resources that use a number of computational resources that is larger than or smaller than an available number of computational resources. That is, the constraints can include a constraint given by $$\Delta_{d_1} + \ldots + \Delta_{d_{|D_Z|}} = C_z \quad (2)$$

where $\Delta_{d_i} = \alpha_{d_i} \times c_{d_i}$ represents an optimal allocation of computational resources for executing an ESG process associated with ESG dimension $d_1$ to achieve an increased, e.g., maximal, sustainability gain, $\alpha_{d_i}$ represents an optimization parameter corresponding to ESG dimension $d_i$ (as defined above) $c_{d_i}$ represents a (predefined) computational resource cost of unit sustainability gain on ESG dimension d, and $C_z$ represents the computational resources to be distributed across ESG processes including, e.g., computational servers in a cloud, network bandwidth for data communication, storage type and capacity.

In some implementations the system can solve the constrained optimization using optimization software, e.g., a linear programming solver.

The system can determine the allocation of computational resources to ESG computational processes associated with the ESG dimensions using the values of the optimization parameters that optimize the objective function. For example, for each ESG dimension, the system can determine an optimal allocation of computational resources for executing an ESG process associated with the ESG dimension by multiplying the value of the optimization parameter da for the ESG dimension by the corresponding computational resource cost ca of the unit sustainability gain on the ESG dimension. This multiplication produces a number (e.g., $\Delta_d$) that represents a number of computational resources to be assigned to ESG computational processes associated with the ESG dimension.

The system can then initiate an allocation of the computational resources to the ESG computational processes associated with the ESG dimensions according to the determined allocation (step 410).

For example, in some implementations the system can perform example process 400 to determine that a particular number or amount of computational resources should be assigned to ESG computational processes associated with average greenhouse gas emissions. For example, the system can determine that a first number of sensors should be made available for measuring greenhouse gas emissions including direct emissions from vehicles and manufacturing, electricity, utilities, and indirect activities like worker commutes and waste disposal. As another example, the system can determine that a first amount of network bandwidth or a first amount of data storage be made available for transmitting or storing measured greenhouse gas emissions from vehicles and manufacturing.

In other implementations, the system can determine that a second number or amount of computational resources should be assigned to ESG computational processes associated with source energy usage. For example, the system can determine that a second number of sensors should be made available for measuring energy consumption at each physical site, energy transmission, delivery, and production losses. As another example, the system can determine that a second amount of network bandwidth or a first amount of data storage be made available for transmitting or storing measured values of energy consumption.

Figure 5:
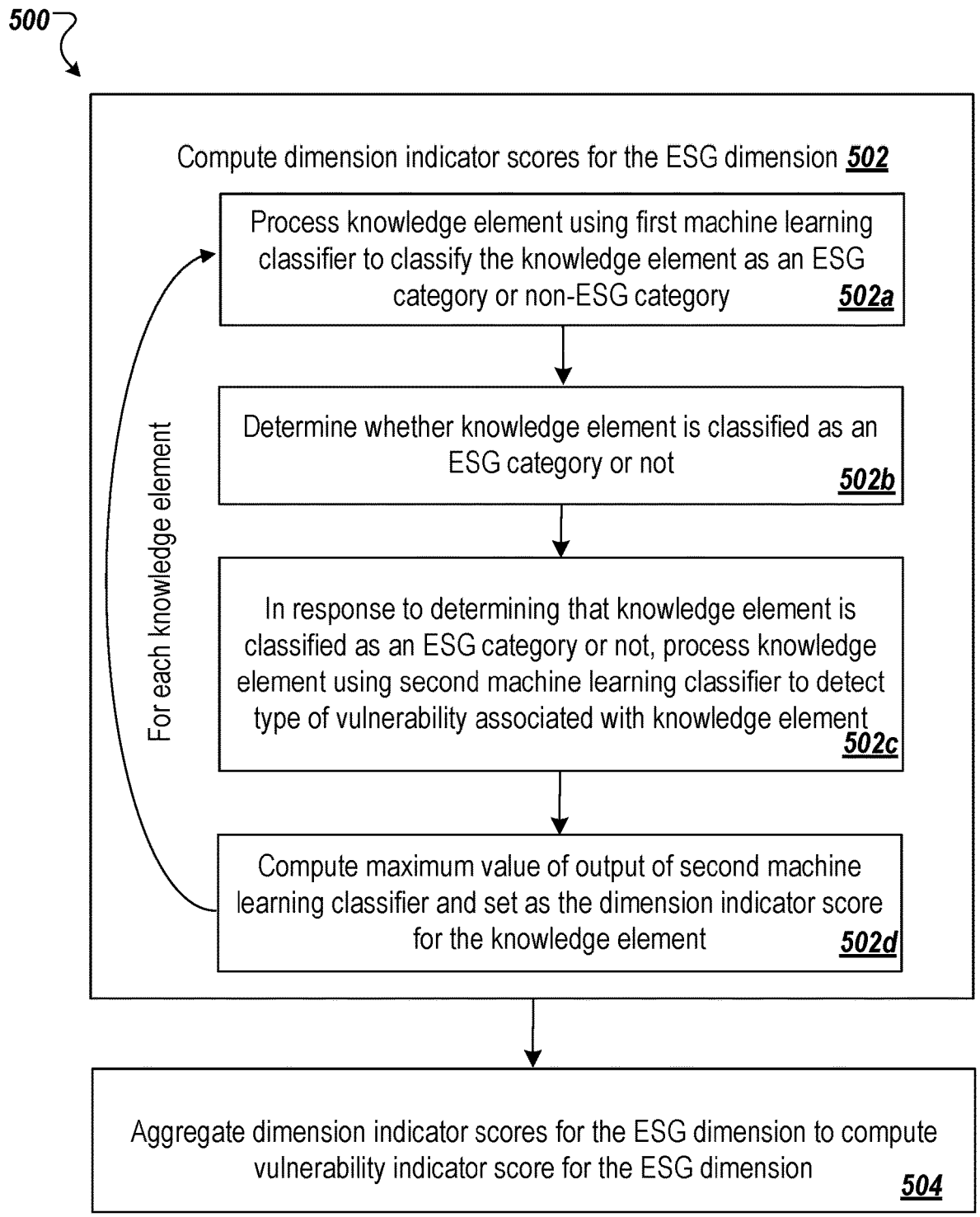
FIG. 5 is a flow chart of an example process for computing a vulnerability indicator score for an ESG dimension.

FIG. 5 is a flow chart of an example process 500 for computing a vulnerability indicator score for a specific ESG dimension. For convenience, the process 500 will be described as being performed by a system of one or more computers located in one or more locations. For example, the computational resource allocation system 200 of FIG. 2, appropriately programmed, can perform example process 500.

The system computes dimension indicator scores for the ESG dimension (step 502). Each dimension indicator score $DisScore(a)_{d,Z}$ for the ESG dimension corresponds to a respective knowledge element a in one of the ESG disclosures and represents an extent to which the knowledge element indicates a vulnerability on the ESG dimension.

To compute a dimension indicator score for the ESG dimension and for a respective knowledge element, the system processes the knowledge element using a first trained machine learning classifier to classify the knowledge element as belonging to one of multiple categories (step 502a). The categories include ESG categories, e.g., environment, social, and governance, and one non-ESG category.

The system then determines whether the knowledge element is classified as belonging to an ESG category or a non-ESG category (step 502b). In response to determining that the knowledge element is classified as belonging to a non-ESG category, the system terminates the process of computing a dimension indicator score for the knowledge element. In response to determining that the knowledge element is classified as belonging to an ESG category, the system processes the knowledge element using a second machine learning classifier to obtain a first output that detects a type of vulnerability associated with the knowledge element and a second output that predicts whether the vulnerability is solved, ongoing, or potential (step 502c).

The system then determines whether the second output predicts that the vulnerability is solved or not. In response to determining that the second output predicts that the vulnerability is solved, the system terminates the process of computing a dimension indicator score for the knowledge element. In response to determining that the second output predicts that the vulnerability is not solved, the system computes the dimension indicator score for the ESG dimension and knowledge element as equal to a maximum value of the output (step 502d), e.g., $DisScore = \max(Softmax(C_h))$ where $C_h$ represents the output of the second machine learning classifier. The system repeats steps 502a-502d for each knowledge element in the ESG disclosures.

The system then aggregates the dimension indicator scores DisScore for the ESG dimension to compute the vulnerability indicator score for the ESG dimension (step 504). For example, the vulnerability indicator scorer 104 can aggregate the computed DisScores over knowledge elements that are both included in the knowledge source (e.g., knowledge elements included in the ESG disclosures received from the vulnerability indicator scorer 104 at stage (C)) and included in a set of knowledge elements that indicate potential vulnerabilities for the ESG dimension. That is, the vulnerability indicator scorer 104 can compute a VIS for ESG dimension d as $$VIS(K, d, Z, T) = \sum_{(a \in R_d) \wedge (a \in K)} DisScore(a)_{d,Z} \quad (3)$$

where K represents a knowledge source for entity Z that includes ESG disclosures from a predetermined historical time period T, DisScore(a)$_{d,Z}$ represents a DisScore for a knowledge element a included in an ESG disclosure in the knowledge source K for entity Z and ESG dimension d, $R_d$ represents a set of knowledge elements that indicate a potential vulnerability along ESG dimension d, and (a∈ $R_d$)/ (a∈ K) represents a logical conjunction of knowledge elements in the set Ra and knowledge elements in the knowledge source K. The set $R_d$ is a set of knowledge elements that have a DisScore that is higher than a predefined threshold. Eq. (3) represents an aggregation of knowledge elements with significant DisScores.

Figure 6:
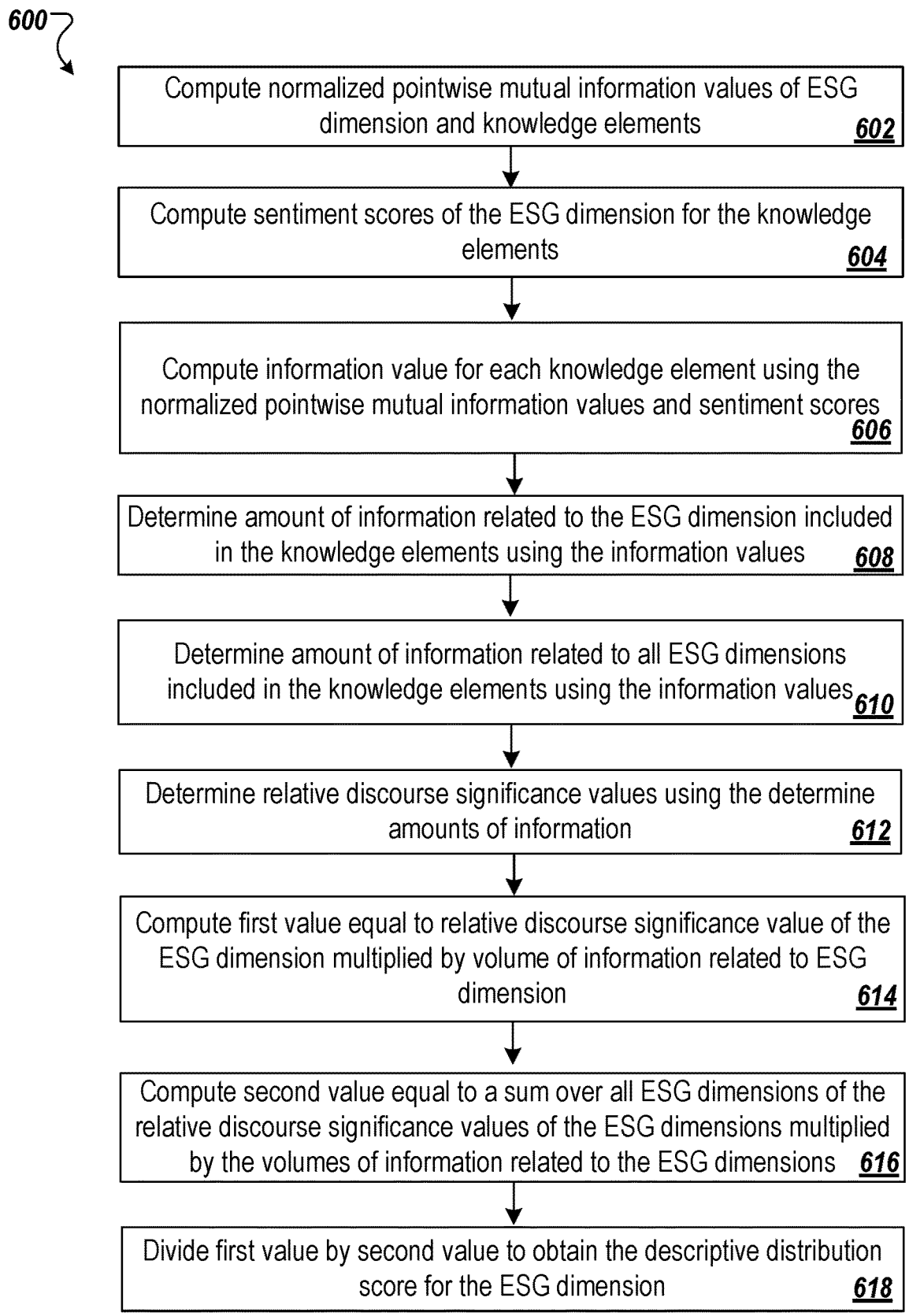
FIG. 6 is a flow chart of an example process for computing a descriptive distribution score for an ESG dimension.

FIG. 6 is a flow chart of an example process 600 for computing a descriptive distribution score. For convenience, the process 600 will be described as being performed by a system of one or more computers located in one or more locations. For example, the computational resource allocation system 200 of FIG. 2, appropriately programmed, can perform example process 600.

The system computes normalized pointwise mutual information values of the ESG dimension d and knowledge elements a in the ESG disclosures (step 602). The point-wise mutual information of the ESG dimension and an knowledge element provides a measure of association between the ESG dimension and the knowledge element and compares the probability of the ESG dimension and knowledge element occurring together (e.g., that the knowledge element relates to the ESG dimension) to what this probability would be if the ESG dimension and the knowledge element are independent. That is, the system computes $$nPMI(a, d)_K = \left(\ln \frac{p(a, d)}{p(a) * p(d)}\right) / -\ln(p(a, d)) \quad (4)$$

for each knowledge element a in the ESG disclosures from the knowledge source K, where d represents the ESG dimension, p(a, d) represents the joint probability of a and d with respect to knowledge source K, p(a) represents the marginal probability of a, and p(d) represents the marginal probability of d. These probabilities can be estimated by scanning the ESG disclosures and counting occurrences/mentions of ESG dimensions and knowledge elements within the ESG disclosures.

The system then computes sentiment scores of the ESG dimension for the knowledge elements in the ESG disclosures (step 604). A sentiment score for an ESG dimension and a knowledge element is a score that indicates whether the knowledge element positively or negatively relates to the ESG dimension, e.g., where a high sentiment score represents a high likelihood that the knowledge element is positively related to the ESG dimension and a low sentiment score represents a low likelihood that the knowledge element is positively related to the ESG dimension. The sentiment scores can be estimated using conventional sentiment analysis techniques or obtained from an external system that implements sentiment analysis techniques.

The system uses the normalized pointwise mutual information values and the sentiment scores to compute an information value for each of the knowledge elements in the ESG disclosures (step 606). The information value of a knowledge element a and ESG dimension d estimates how much mutual information knowledge element a has about ESG dimension d with respect to the knowledge source K together with a degree of sentiments indicated by knowledge element a about the entity Z. An information value for a knowledge element comprises a weighted sum of the normalized pointwise mutual information value of the ESG dimension and the knowledge element and the sentiment score of the ESG dimension for the knowledge element. That is, the system computes $$info(a)=\beta*nPMI(a,d)_K+(1-\beta)*SentimentScore(a)_{d,K} \quad (5)$$

where the weight β is a constant that represents a relative significance of mutual information as compared to sentiments, nPMI(a, d)$_K$ represents the normalized point-wise mutual information for the knowledge element a and the ESG dimension d as defined in Eq. (4) above and SentimentScore(a)$_{d,K}$ represents the sentiment score for the knowledge element a and the ESG dimension d.

The system then uses the computed information values info (a) to aggregate over the knowledge elements included in the ESG disclosures and determine an amount (or volume) of information related to the ESG dimension included in knowledge elements in the ESG disclosures that are related to the ESG dimension (step 608). That is, the system computes a sum of the information values over knowledge elements a that characterize or are otherwise related to the ESG dimension d, e.g., $$infVol(d, K, Z) = \sum_{a \in C_d} info(a) \quad (6)$$

where $C_d$ represents a set of knowledge elements that characterize or are otherwise related to the ESG dimension d and info(a) is defined above in Eq. (5).

The system also determines an amount of information related to all of the one or more ESG dimensions included in knowledge elements in the ESG disclosures (step 610). That is, the system computes $\Sigma_{d' \in D} infVol(d', K_t, Z)$.

The system then uses the computed volumes of relevant quantifiable information to determine relative discourse significance (RDS) values that represent a relative significance of each ESG dimension. The RDS of a specific ESG dimension is equal to a ratio of the information related to the ESG dimension d to information related to all ESG dimensions across the ESG disclosures from the predetermined historical time period. That is, the system computes a relative discourse significance value for the ESG dimension by dividing the amount of information related to the ESG dimension included in knowledge elements in the ESG disclosures that are related to the ESG dimension by the amount of information related to all of the one or more ESG dimensions included in knowledge elements in the ESG disclosures (step 612), e.g., $$m_d(t) = \sum_{t \in T} \frac{infVol(d, K_t, Z)}{\sum_{d' \in D} infVol(d', K_t, Z)} \quad (7)$$

where t∈ T represents time steps in the historical time period T, D represents all ESG dimensions described in the ESG disclosures from the predetermined historical time period, $K_t$ represents the knowledge source at time step t, and infVol(d, $K_t$, Z) is the volume of relevant quantifiable information contained in the knowledge source $K_t$ specific to the ESG dimension d as defined in Eq. (6) above.

In some implementations the system adjusts some or all of the RDS values for respective ESG dimensions. For example, in some cases a RDS value $m_d(t)$ of an ESG dimension can have a low value, indicating that the ESG dimension is relatively insignificant to the entity or cluster of entities. However, this may not accurately reflect the entity's current priorities or focus. To avoid such discrepancies, in some implementations the system can receive a data input that specifies one or more ESG dimensions that are of current importance or significance to the entity. The data input can include a set of materiality values Y={$mat_{d_1}$(t), ..., $mat_{d_{|D|}}$(t)} where each materiality value $mat_{d_i}$(t) corresponds to a respective ESG dimension $d_i$ and represents a measure of current importance. The materiality values can take values between 0 and 1, where a value of 0 indicates that the dimension is not important/insignificant to the organization and a value of 1 indicates that the dimension is extremely important/significant to the organization. In some implementations an operating environment of the organization can provide values only for material dimensions, e.g., currently important dimensions. In these implementations, values of other dimensions not included in the input provided by the organization can be automatically set to 0.

In response to receiving the data input, the system can adjust the determined RDS values. For example, the system can compute correlation values for the ESG dimensions, where the correlation values are used to scale the determined RDS values to reflect the entity's current priorities or focus. A correlation value for a specific ESG dimension d can be given by $$\text{Corr}_{X,Y}(d, t) = \frac{(m_d(t) - \bar{X})(mat_d(t) - \bar{Y})}{\sqrt{\sum_{d_i \in D}(m_{d_i}(t) - \bar{X})^2} \sqrt{\sum_{d_i \in D}(mat_{d_i}(t) - \bar{Y})^2}} \quad (8)$$

where $X = \left( m_{d_1}(t), \ldots, m_{d_{|D|}}(t) \right)$ represents a set of RDS values $m_d(t)$ for the ESG dimensions $d \in D$ (as computed according to Eq. (7)), Y={$mat_{d_1}(t), \ldots, mat_{d_{|D|}}(t)$} represents the set of materiality values $mat_d(t)$ for ESG dimensions $d \in D$ (as received as input), $t \in T$ represents time steps in the historical time period T, $\bar{X}$ represents an average value of the set X and $\bar{Y}$ represents an average value of the set Y.

The system can then adjust the RDS values ma(t) by multiplying each value by its respective correlation value. That is, the system can set $$m_d(t) := m_d(t) * \text{Corr}_{X,Y}(d,t) \quad (9)$$

for each ESG dimension.

Returning to FIG. 6, the system computes a first value that includes a relative discourse significance value of the ESG dimension multiplied by a volume of relevant quantifiable information contained in the knowledge source specific to the ESG dimension (step 614). That is, the system computes $m_d(t)*\text{infVol}(d,K,Z)$. The system then computes a second value that includes a sum, over all ESG dimensions, of a relative discourse significance of an ESG dimension multiplied by a volume of relevant quantifiable information contained in the knowledge source specific to the ESG dimension (step 616). That is, the system computes $\Sigma_{d_i \in D} m_{d_i}(t) \text{infVol}(d_i,K,Z)$.

The system can then compute the descriptive distribution score for the ESG dimension by dividing the first value by the second value (step 618). That is, the system computes $$DDS(K, Z, d, t) = \frac{m_d(t) * infVol(d, K, Z)}{\sum_{d_i \in D} m_{d_i}(t) \, infVol(d_i, K, Z)} \quad (10)$$

where D represents the set of ESG dimensions and $d_i$ represents an element in the set D, $m_d(t)$ is defined in Eq. (7) or Eq. (9) above and infVol(d,K,Z) is defined in Eq. (6) above.

Implementations and all of the functional operations described in this specification may be implemented in digital electronic circuitry, or in computer software, firmware, or hardware, including the structures disclosed in this specification and their structural equivalents, or in combinations of one or more of them. Implementations may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A computer implemented method comprising:
   obtaining data from a knowledge source for an entity, the knowledge source comprising a plurality of environmental, social, and governance (ESG) disclosures, wherein the ESG disclosures relate to one or more ESG dimensions;
   computing, using the obtained data, a vulnerability indicator score (VIS) for each of the ESG dimensions, wherein a vulnerability indicator score for an ESG dimension of the one or more ESG dimensions represents a measure of latent vulnerability with respect to the ESG dimension;
   computing, using the obtained data, a descriptive distribution score for each of the ESG dimensions, wherein the descriptive distribution scores represent a distribution of descriptions of the ESG dimensions within the knowledge source, and wherein computing a descriptive distribution score for an ESG dimension of the one or more ESG dimensions comprises:
      computing a first value comprising a relative discourse significance value of the ESG dimension multiplied by a volume of relevant quantifiable information contained in the knowledge source specific to the ESG dimension;
      computing a second value comprising a sum, over all ESG dimensions, of a relative discourse significance of an ESG dimension multiplied by a volume of relevant quantifiable information contained in the knowledge source specific to the ESG dimension; and
      computing the descriptive distribution score for the ESG dimension by dividing the first value by the second value;
   determining, using the vulnerability indicator scores and the descriptive distribution scores, an allocation of computational resources to ESG computational processes associated with the ESG dimensions that achieves an increased gain in sustainability for the entity; and
   initiating allocation of the computational resources to the ESG computational processes associated with the ESG dimensions according to the determined allocation.

2. The method of claim 1, wherein computing a VIS for an ESG dimension comprises:
   computing dimension indicator scores for the ESG dimension, wherein each dimension indicator score for the ESG dimension corresponds to a respective knowledge element in one of the ESG disclosures and represents an extent to which the knowledge element indicates a vulnerability on the ESG dimension; and aggregating dimension indicator scores for the ESG dimension to compute a VIS for the ESG dimension.

3. The method of claim 2, wherein computing a dimension indicator score for the ESG dimension comprises:

processing a respective knowledge element using a first machine learning classifier to classify the knowledge element as belonging to one of multiple categories, the categories comprising ESG categories and one non-ESG category;

determining whether the knowledge element is classified as belonging to an ESG category;

in response to determining that the knowledge element is classified as belonging to an ESG category, processing the knowledge element using a second machine learning classifier to obtain an output that detects a type of vulnerability associated with the knowledge element; and computing the dimension indicator score for the ESG dimension as equal to a maximum value of the output.

4. The method of claim 3, wherein processing the knowledge element using a second machine learning classifier further comprises obtaining data that predicts whether the vulnerability is solved, ongoing, or potential.

5. The method of claim 3, wherein the first machine learning classifier comprises:

a trained ROBERTa model comprising multiple hidden layers, wherein the ROBERTa model is configured to receive a knowledge element as input;

two or more dense layers configured to receive outputs from the ROBERTa model; and a classification layer with softmax activation configured to receive outputs from the two or more dense layers.

6. The method of claim 3, wherein the second machine learning classifier comprises:

a trained ROBERTa model comprising multiple hidden layers, wherein the ROBERTa model is configured to receive a knowledge element as input;

four dense layers, each configured to receive an output from a respective last layer of the ROBERTa model, wherein the four dense layers identify structure and hidden causes of a vulnerability from the knowledge element;

a fifth dense layer configured to receive outputs from each of the four dense layers;

a classification layer configured to receive an output from the fifth dense layer;

a BiLSTM layer configured to receive an output from a last layer of the ROBERTa model; and a temporal prediction layer configured to receive an output from the BiLSTM layer and output a temporal prediction for the vulnerability.

7. The method of claim 1, wherein a descriptive distribution score for an ESG dimension is dependent on normalized pointwise mutual information values of the ESG dimension and knowledge elements in the ESG disclosures and sentiment scores of the ESG dimension for the knowledge elements in the ESG disclosures.

8. The method of claim 7, wherein computing a descriptive distribution score for an ESG dimension comprises:

computing normalized pointwise mutual information values of the ESG dimension and knowledge elements in the ESG disclosures;

computing sentiment scores of the ESG dimension for the knowledge elements in the ESG disclosures;

computing, using the normalized pointwise mutual information values and the sentiment scores, an information value for each of the knowledge elements in the ESG disclosures, wherein an information value for a knowledge element comprises a weighted sum of the normalized pointwise mutual information value of the ESG dimension and the knowledge element and the sentiment score of the ESG dimension for the knowledge element.

9. The method of claim 1, wherein the descriptive distribution score for the ESG dimension is dependent on relative discourse significance values that represent relative significances of the ESG dimensions to the entity.

10. The method of claim 9, wherein computing the descriptive distribution score for the ESG dimension further comprises:

determining an amount of information related to the ESG dimension included in knowledge elements in the ESG disclosures that are related to the ESG dimension;

determining an amount of information related to all of the one or more ESG dimensions included in knowledge elements in the ESG disclosures; and computing the relative discourse significance value for the ESG dimension by dividing the amount of information related to the ESG dimension included in knowledge elements in the ESG disclosures that are related to the ESG dimension by the amount of information related to all of the one or more ESG dimensions included in knowledge elements in the ESG disclosures.

11. The method of claim 9, further comprising:

receiving a data input comprising a set of materiality values, wherein the materiality values represent a current importance of one or more of the ESG dimensions to the entity;

in response to receiving the data input, computing a correlation value for each of the one or more ESG dimensions; and adjusting, using the correlation values, the relative discourse significance values of the one or more ESG dimensions.

12. The method of claim 1, wherein determining an allocation of computational resources to ESG computational processes associated with the ESG dimensions that achieves an increased gain in sustainability for the entity comprises:

performing a constrained optimization to determine values of optimization parameters that optimize an objective function, wherein each optimization parameter corresponds to a respective ESG dimension and represents a number of units of sustainability gains for the respective ESG dimension, and the objective function comprises a weighted linear sum, over all ESG dimensions, of a vulnerability indicator score for a ESG dimension added to a descriptive distribution score for the ESG dimension, wherein each term in the linear sum is weighted by a respective optimization parameter for the ESG dimension.

13. The method of claim 12, wherein the constrained optimization comprises a constraint that penalizes solutions to the constrained optimization that produce an allocation of computational resources that use a number of computational resources that is larger than or smaller than an available number of computational resources.

14. The method of claim 12, further comprising determining the allocation of computational resources to ESG computational processes associated with the ESG dimensions using the values of the optimization parameters that optimize the objective function, comprising, for each ESG dimension:
multiplying a value of an optimization parameter for the ESG dimension by a corresponding computational resource cost of the units of sustainability gain on the ESG dimension.

15. The method of claim 1, wherein the computational resources comprise computational servers in a cloud, network bandwidth for data communication, storage or capacity and wherein the ESG computational processes comprise data generation, storage, processing, communication, information extraction by analyzing temporal patterns, outlier detection and analysis of outliers, or processes for measuring emissions or energy usage.

16. The method of claim 1, wherein the ESG disclosures comprise one or more of sustainability reports, social media feeds, articles, and news reports and wherein the one or more ESG dimensions comprise low-level dimensions directly determined from the knowledge source and high-level dimensions obtained by aggregating over the low-level dimensions.

17. The method of claim 1, wherein the obtained data comprises data representing ESG disclosures relating to vulnerabilities across the one or more ESG dimensions, and wherein the method further comprises processing ESG disclosures using keyword detection to identify the ESG disclosures relating to vulnerabilities across the one or more ESG dimensions.

18. A system comprising one or more computers and one or more storage devices storing instructions that are operable, when executed by the one or more computers, to cause the one or more computers to perform operations comprising:
obtaining data from a knowledge source for an entity, the knowledge source comprising a plurality of environmental, social, and governance (ESG) disclosures, wherein the ESG disclosures relate to one or more ESG dimensions;
computing, using the obtained data, a vulnerability indicator score (VIS) for each of the ESG dimensions, wherein a vulnerability indicator score for an ESG dimension represents a measure of latent vulnerability with respect to the ESG dimension;
computing, using the obtained data, a descriptive distribution score for each of the ESG dimensions, wherein the descriptive distribution scores represent a distribution of descriptions of the ESG dimensions within the knowledge source, and wherein computing a descriptive distribution score for an ESG dimension of the one or more ESG dimensions comprises:
computing a first value comprising a relative discourse significance value of the ESG dimension multiplied by a volume of relevant quantifiable information contained in the knowledge source specific to the ESG dimension;
computing a second value comprising a sum, over all ESG dimensions, of a relative discourse significance of an ESG dimension multiplied by a volume of relevant quantifiable information contained in the knowledge source specific to the ESG dimension; and
computing the descriptive distribution score for the ESG dimension by dividing the first value by the second value;
determining, using the vulnerability indicator scores and the descriptive distribution scores, an allocation of computational resources to ESG computational processes associated with the ESG dimensions that achieves an increased gain in sustainability for the entity; and
initiating allocation of the computational resources to the ESG computational processes associated with the ESG dimensions according to the determined allocation.

19. A computer implemented method, comprising:
obtaining data from a knowledge source for an entity, the knowledge source comprising a plurality of environmental, social, and governance (ESG) disclosures, wherein the ESG disclosures relate to one or more ESG dimensions;
computing, using the obtained data, a vulnerability indicator score (VIS) for each of the ESG dimensions, wherein a vulnerability indicator score for an ESG dimension represents a measure of latent vulnerability with respect to the ESG dimension;
computing, using the obtained data, a descriptive distribution score for each of the ESG dimensions, wherein the descriptive distribution scores represent a distribution of descriptions of the ESG dimensions within the knowledge source;
determining, using the vulnerability indicator scores and the descriptive distribution scores, an allocation of computational resources to ESG computational processes associated with the ESG dimensions that achieves an increased gain in sustainability for the entity, wherein determining the allocation of the computational resources to the ESG computational processes associated with the ESG dimensions that achieves the increased gain in the sustainability for the entity comprises:
performing a constrained optimization to determine values of optimization parameters that optimize an objective function, wherein
each optimization parameter corresponds to a respective ESG dimension and represents a number of units of sustainability gains for the respective ESG dimension, and
the objective function comprises a weighted linear sum, over all ESG dimensions, of a vulnerability indicator score for a ESG dimension added to a descriptive distribution score for the ESG dimension, wherein each term in the linear sum is weighted by a respective optimization parameter for the ESG dimension; and
initiating allocation of the computational resources to the ESG computational processes associated with the ESG dimensions according to the determined allocation.

* * * * *